(12) United States Patent
Oshima

(10) Patent No.: US 7,465,329 B2
(45) Date of Patent: Dec. 16, 2008

(54) INTAKE SYSTEM

(75) Inventor: Tadashi Oshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 497 days.

(21) Appl. No.: 11/226,396

(22) Filed: Sep. 15, 2005

(65) Prior Publication Data

US 2006/0064952 A1 Mar. 30, 2006

(30) Foreign Application Priority Data

Sep. 29, 2004 (JP) ............................. 2004-284323

(51) Int. Cl.
*B01D 46/00* (2006.01)
(52) U.S. Cl. .................... 55/385.3; 55/490; 55/502; 55/495; 454/75; 454/158; 123/198 E; 180/68.3; 180/219
(58) Field of Classification Search ............... 55/385.3, 55/490, 502, 495; 454/75, 158; 123/198 E; 180/68.3, 219
See application file for complete search history.

(56) References Cited

U.S. PATENT DOCUMENTS

| | | | | |
|---|---|---|---|---|
| 6,478,105 B2 * | 11/2002 | Okuma | ........................ | 180/219 |
| 6,814,772 B1 * | 11/2004 | Wake et al. | ................ | 55/385.3 |
| 6,824,583 B2 * | 11/2004 | Bulger | ....................... | 55/385.3 |
| 2004/0139708 A1 * | 7/2004 | Giacinto | ..................... | 55/385.3 |
| 2004/0206058 A1 * | 10/2004 | Bugli et al. | ................. | 55/385.3 |
| 2005/0022488 A1 * | 2/2005 | Condrad | .................... | 55/385.3 |
| 2006/0230728 A1 * | 10/2006 | Tsuruta et al. | ............. | 55/385.3 |
| 2007/0175187 A1 * | 8/2007 | Kopec et al. | ................ | 55/385.3 |

FOREIGN PATENT DOCUMENTS

| | | |
|---|---|---|
| JP | 1-10319 Y2 | 3/1989 |
| JP | 2003-56420 A | 2/2003 |

\* cited by examiner

*Primary Examiner*—Duane Smith
*Assistant Examiner*—Minh-Chau T. Pham
(74) *Attorney, Agent, or Firm*—Birch, Stewart, Kolasch & Birch, LLP

(57) ABSTRACT

An intake system with an air cleaner case that is reduced in size with an enhancement in intake efficiency. A tubular tip end portion of a connecting tube provides a connection between the carburetor side and the air cleaner case with the tubular tip end portion being disposed in the air cleaner case. A tubular opening end portion is provided in an air cleaner element contained in the air cleaner case for connecting to the tubular tip end portion of the connecting tube. A large diameter portion is provided in a frame member serving as a core of the air cleaner element for supporting the tubular end portion and the tubular opening end portion in a condition wherein the tubular tip end portion and the tubular opening end portion are fitted to each other. The large diameter portion is larger in diameter than any other portion of the frame member.

20 Claims, 5 Drawing Sheets

INTAKE SYSTEM

CROSS-REFERENCE TO RELATED APPLICATIONS

The present non-provisional application claims priority under 35 USC 119 to Japanese Patent Application No. 2004-284323 filed on Sep. 29, 2004 the entire contents thereof is hereby incorporated by reference.

BACKGROUND OF THE INVENTION

1. Field of the Invention

The present invention relates to an improvement in an intake system.

2. Description of Background Art

A conventional intake system is known wherein a filter is pressed against an inner wall portion of a cleaner case by a filter holder so as to fix the filter to the cleaner case. See, for example, Japanese Patent Laid-open No. 2003-56420. In addition, the present inventor has provided a conventional intake system in which a base for supporting an air cleaner element is attached to a front surface of an air cleaner case by small screws. See, for example, Japanese Patent Laid-open No. 2003-56420.

As illustrated in FIG. 2(B) of Japanese Patent Laid-open No. 2003-56420, a cleaner case constitutes an air cleaner main body and is provided with an opening portion. An annular joint portion is provided for connecting an air feed tube by a fitting that projects on the periphery of the opening portion, one end portion of a filter abuts on an inner wall portion on the inside of the joint portion and is fixed by pressing it with a filter holder.

As illustrated in FIG. 3 of Japanese Utility Model Publication No. Hei 1-10319, a base is mounted to a front opening portion of an air cleaner case by small screws. An air cleaner element is mounted to the base by a mount bolt. A connecting tube connecting portion for connecting a connecting tube is provided at a front portion of the base portion 36

In Japanese Patent Laid-open No. 2003-56420, there is adopted a structure in which the surface of one end portion of the filter is fixed by pressing it against an inner wall portion of the cleaner case, so that when the width in the radial direction of the surface of the one end portion of the filter is enlarged, the cleaner case becomes larger in size, and the passage that is in communication from inside of the filter into the air feed tube is narrowed. Thus, the air feed quantity is reduced, and intake efficiency is lowered.

On the other hand, in Japanese Utility Model Publication No. Hei 1-10319, the mounting portion wherein the base is mounted to the air cleaner case by small screws is located on the outside in the radial direction of the air cleaner element, so that the front opening portion of the air cleaner case must be made larger than the outer shape of the air cleaner element by the mount portion, leading to an enlargement of the size of the air cleaner case. Or, in the case where the front opening portion of the air cleaner case is restricted to a predetermined size, the outer shape of the air cleaner element is smaller by the mount portion, so that the opening portion is also smaller, thus resulting in a reduction in the intake efficiency.

SUMMARY AND OBJECTS OF THE INVENTION

It is an object of an embodiment of the present invention to improve an intake system and thereby to enhance a reduction in the size of an air cleaner case and to provide an enhancement in the intake efficiency.

An embodiment of the present invention resides in an intake system being disposed on the upstream side of a producer for the production of an air-fuel mixture and includes an air cleaner case and a connecting tube for connecting the producer and the air cleaner case. The intake system includes a tip end portion of the connecting tube with the tip end portion disposed in the air cleaner case.

An opening end portion is provided in an air cleaner element contained in the air cleaner case, for connecting to the tip end portion of the connecting tube. A support portion is provided in a frame member serving as a core of the air cleaner element, for supporting the tip end portion and the opening end portion in a condition where the tip end portion and the opening end portion are fitted to each other. The support portion is larger in diameter than any other portion of the frame member.

Since the tip end portion of the connecting tube and the opening end portion of the air cleaner element are fitted to each other and the support portion for supporting the tip end portion and the opening end portion is larger in diameter than any other portion of the frame member, the space in the radial direction of the connection portion between the connecting tube and the air cleaner element is reduced.

In addition, since the support portion is larger in diameter than the other portions of the frame member, it is possible to secure a large air passage in the air cleaner element.

An embodiment of the present invention provides a tip end portion that is disposed on the inside of the opening end portion.

For example, in the case where the tip end portion is disposed on the outside of the opening end portion, if a gap exist between the tip end portion and the opening end portion, air can easily flow from the dirty side in the air cleaner case through the gap into the connecting tube. In the present invention, since the tip end portion is disposed on the inside of the opening end portion, air on the dirty side would not easily flow into the connecting tube, i.e., into the inside of the clean side.

An embodiment of the present invention provides an air cleaner element that is tubular in shape.

With the air cleaner element being tubular in shape, the occupying space in the air cleaner case is reduced as compared with, for example, the case where the air cleaner element is box-like in shape.

An embodiment of the present invention provides the tip end portion of the connecting tube and the opening end portion of the air cleaner element that are fitted to each other. In addition, the support portion for supporting the tip end portion and the opening end portion is set larger in diameter than any other portion of the frame member. Thus, the space in the radial direction at the joint portion between the connecting tube and the air cleaner element can be reduced, and a reduction in the size of the air cleaner case can be obtained.

Further, since the support portion is larger in diameter than the other portions of the frame member, the air passage in the air cleaner element can be secured to be large. Thus, the intake air amount can be increased, and the intake efficiency can be enhanced.

An embodiment of the present invention provides the tip end portion that is disposed on the inside of the opening end portion. Thus, it is possible to make it difficult for air on the dirty side from flowing into the clean side through the fitting portion between the tip end portion and the opening end portion.

An embodiment of the present invention provides the air cleaner element that is tubular in shape, so that the occupying space in the air cleaner case can be reduced. Thus, the air cleaner case can be further reduced in size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below, based on the accompanying drawings. The drawings are to be viewed according to the posture of symbols.

Figure 1:
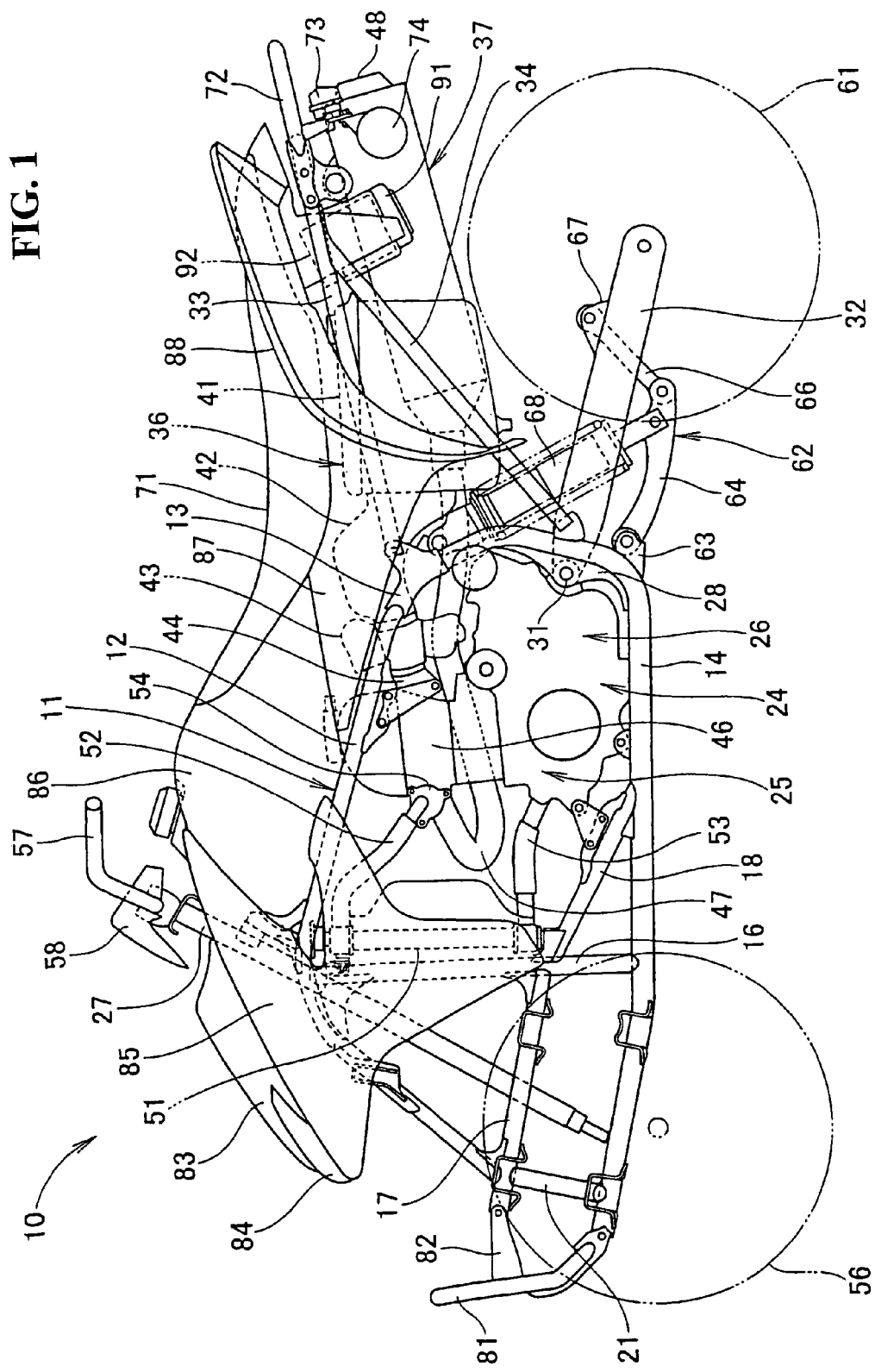
FIG. 1 is a side view of a saddle ride type vehicle including an intake system according to the present invention.

FIG. 1 is a side view of a saddle ride type vehicle including an intake system according to the present invention. The saddle ride type vehicle 10 is an all-terrain vehicle which includes a vehicle body frame 11, and the vehicle body frame 11 is composed of a left-right pair of main pipes 12 that are roughly V-shaped in side view (of members in a left-right pair, only the one on the viewer's side is shown here and hereinafter). A left-right pair of lower pipes 14 are connected to the main pipes 12 respectively through a connection member 13. The vehicle body frame 11 is further composed of a left-right pair of down pipes 16 that extend roughly in a vertical direction between the main pipe 12 and the lower pipe 14, a left-right pair of front reinforcing pipes 17 mounted, respectively, to the front end of the main pipe 12 and the down pipe 16, a left-right pair of rear reinforcing pipes 18 mounted in an inclined direction between the down pipe 16 and the lower pipe 14. The vehicle body frame 11 further includes a left-right pair of front connection pipes 21 mounted in a bridging manner between front portions of the front reinforcing pipe 17 and the lower pipe 14, and a plurality of cross pipes (not shown) for connection between the left and right members.

In addition, the saddle ride type vehicle 10 is a vehicle in which a power unit 24 (composed of an engine 25 and a transmission 26 provided as one body with a rear portion of the engine 25) is supported by the main pipes 12, the lower pipes 14 and the rear reinforcing pipes 18. A steering shaft 27 is rotatably supported by the main pipes 12 and the lower pipes 14. A left-right pair of pivot plates 28 are mounted to rear portions of the main pipes 12 with a swing arm 32 being vertically swingably mounted to the pivot plates 28 through a pivot shaft 31. A left-right pair of seat rails 33 extend rearwardly and upwardly from the connection members 13 with a rear inclined pipe 34 that is mounted in a bridging manner between the seat rail 33 and the lower pipe 14.

The engine 25 has a structure in which an intake system 36 is mounted to a rear portion thereof, and an exhaust system 37 is mounted to a front portion thereof. The intake system 36 includes an air cleaner 41, a connecting tube 42, a carburetor 43, and an intake pipe 44 connected in a sequential manner. The intake pipe 44 is connected to a rear portion of a cylinder head 46 of the engine 25. The exhaust system 37 has a structure in which an exhaust pipe 47 is connected to a front portion of the cylinder head 46 with a muffler 48 being connected to the rear end of the exhaust pipe 47. A radiator 51 is mounted to the vehicle body frame 11 in a roughly vertical direction along the down pipe 16. Hoses 52, 53 are provided for circulating cooling water, respectively, to upper and lower portions of the radiator 51. The hoses 52, 53 extend from the engine 25 side of the vehicle. A water pump 54 is provided on the engine 25 side of the vehicle.

The steering shaft 27 is a member for steering left and right front wheels 56, with a bar handle 57 mounted to an upper end portion thereof. A steering handle cover 58 is attached thereto.

The swing arm 32 is a member that extends to rear end portions wherein left and right rear wheels 61 are mounted through axles with the swing arm 32 being connected to rear lower portions of the lower pipes 14 through a link device 62.

The link device 62 has a structure in which a first link 64 is swingably mounted to a link mount portion 63 that is provided in the lower pipe 14 with a second link 66 being swingably mounted to the first link 64. The tip end of the second link 66 is mounted to a link mount portion 67 provided in the swing arm 32.

The first link 64 is a member to which one end of a rear shock absorber 68 is mounted with the other end of the rear shock absorber 68 being mounted to a cross pipe (not shown) disposed in a bridging manner between the left and right connection members 13.

The seat rails 33 are members such that a seat 71 is mounted to upper portions thereof with a grab rail 72 for the rider to hold being mounted to rear end portions thereof.

The grab rail 72 is a member for supporting a rear light 73 and a tool box 74.

A front bumper 81 is provided together with a bumper support member 82, a front cover 83, a head lamp 84, a front fender 85, a fuel tank 86, a side cover 87 and a rear fender 88. A containing portion 91 is formed as one body with the rear fender 88 with a battery 92 being disposed in the containing portion 91.

Figure 2:
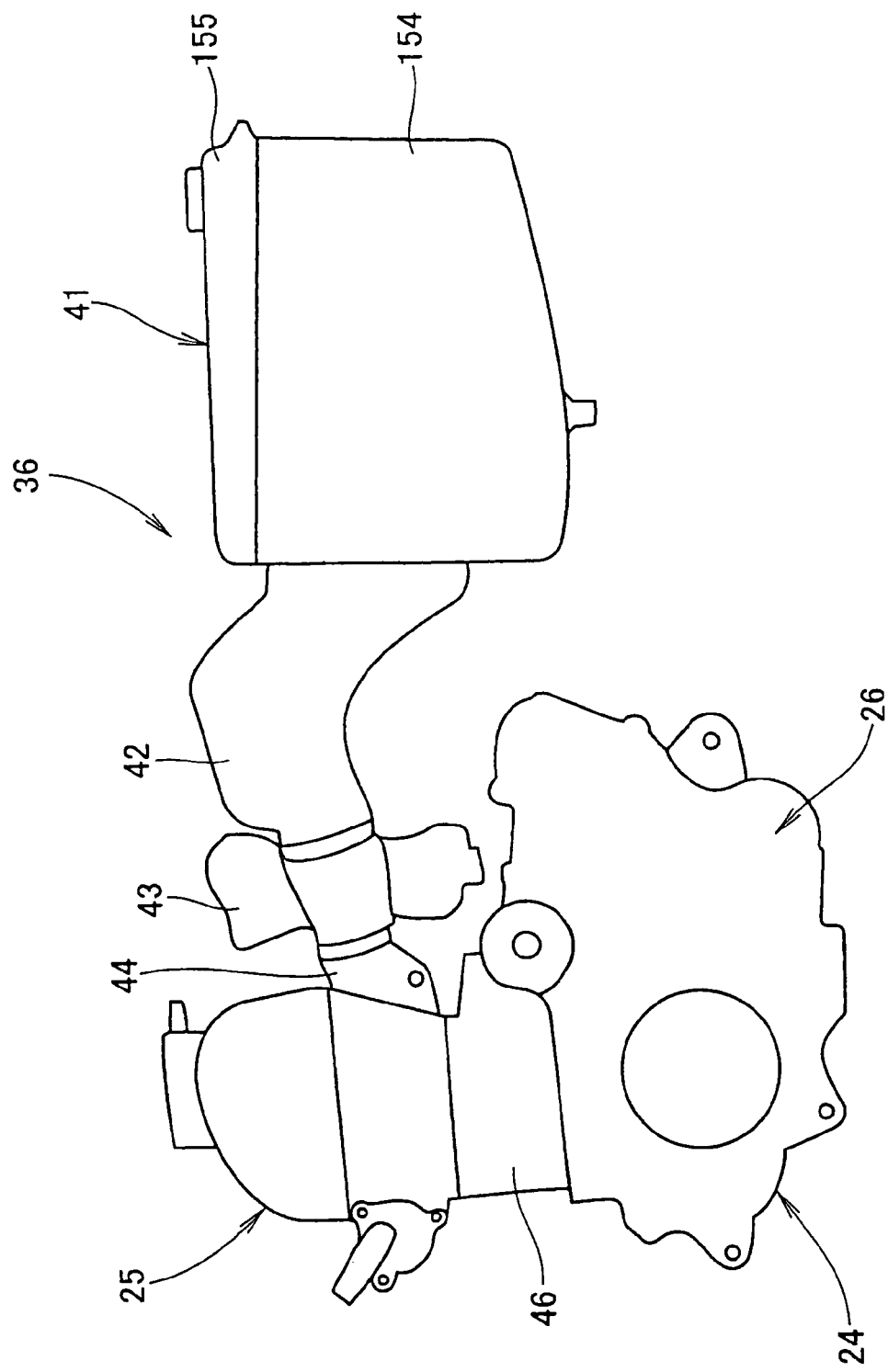
FIG. 2 is a side view of the intake system according to the present invention.

FIG. 2 is a side view of the intake system according to the present invention, in which the intake system 36 is composed of the air cleaner 41 for cleaning intake air, the rubber-made connecting tube 42 connected to the air cleaner 41, the carburetor 43 connected to the tip end of the connecting tube 42, and the intake pipe 44 connected to the carburetor 43 and connected to the cylinder head 46.

Figure 3:
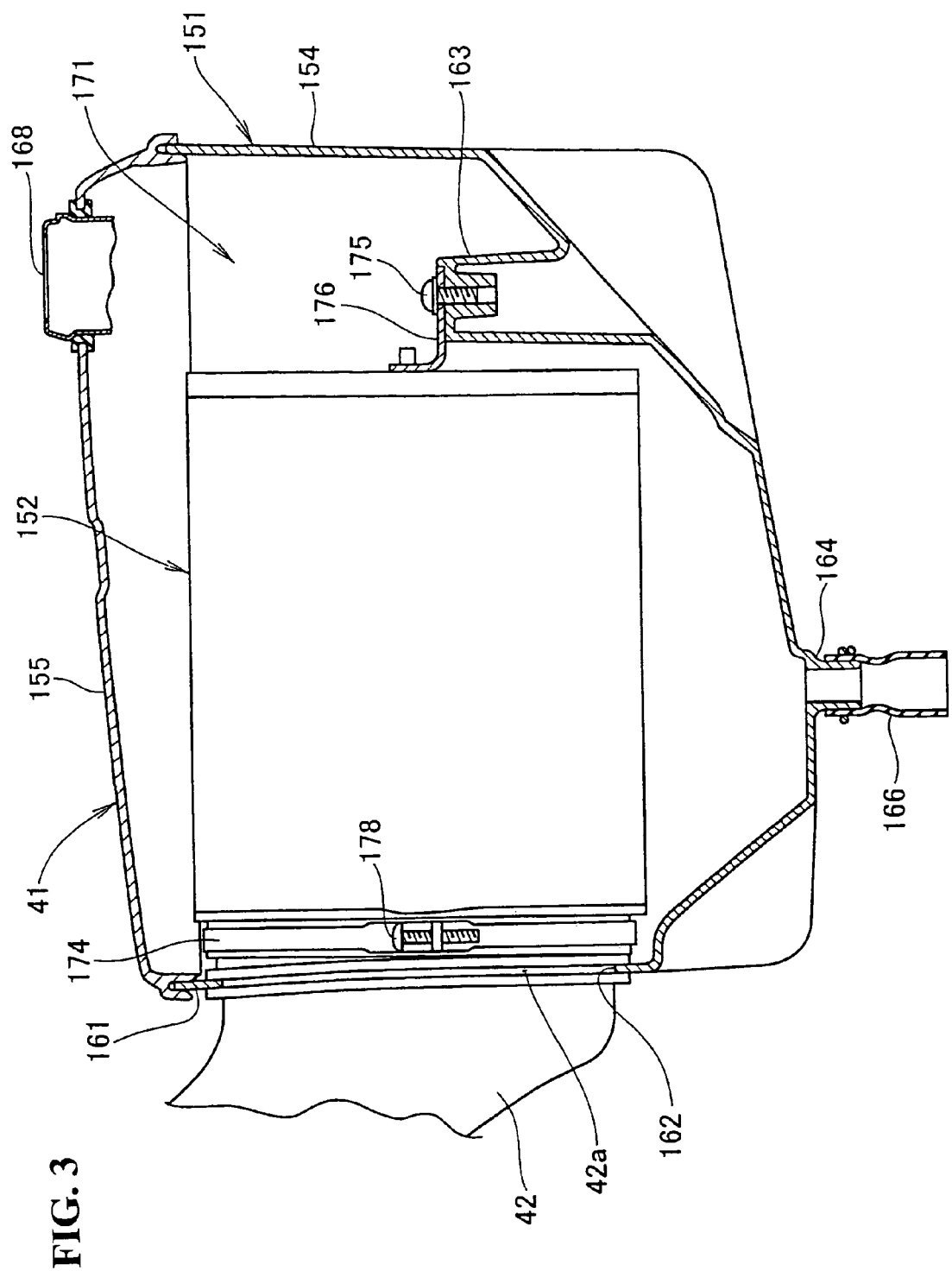
FIG. 3 is a sectional view of an air cleaner according to the present invention.

FIG. 3 is a sectional view of the air cleaner according to the present invention, in which the air cleaner 41 is composed of an air cleaner case 151, and a tubular air cleaner element 152 contained in the air cleaner case 151.

The air cleaner case 151 is composed of a case main body 154, and a case cover 155 for closing an upper opening portion of the case main body 154, and the air cleaner element 152 is mounted to the case main body 154.

The case main body 154 is provided at a front side surface 161 thereof with an opening portion 162 fitted to an annular groove portion 42a of the connecting tube 42. An upper projected portion 163 is provided for supporting an end portion of the air cleaner element 152. A drain port 164 is provided in the bottom for discharging dust, water and the like. A drain hose 166 is connected to the drain port 164. In addition, the case cover 155 includes an intake port 168 for taking the outside air into the air cleaner case 151.

Therefore, inside of the air cleaner case 151, the outside of the air cleaner element 152 is the dirty side 171, whereas the inside of the air cleaner element 152 is the clean side 172 (not shown).

The air cleaner element 152 is a component part one end of which is fitted to the tip end of the connecting tube 42 that is inserted in the case main body 154 and is fastened with a band 174, and the other end of which is supported by a support metal 176 attached to the upper projecting portion 163 by small screws 175. A small screw 178 are provided for fastening the band 174.

Figure 4:
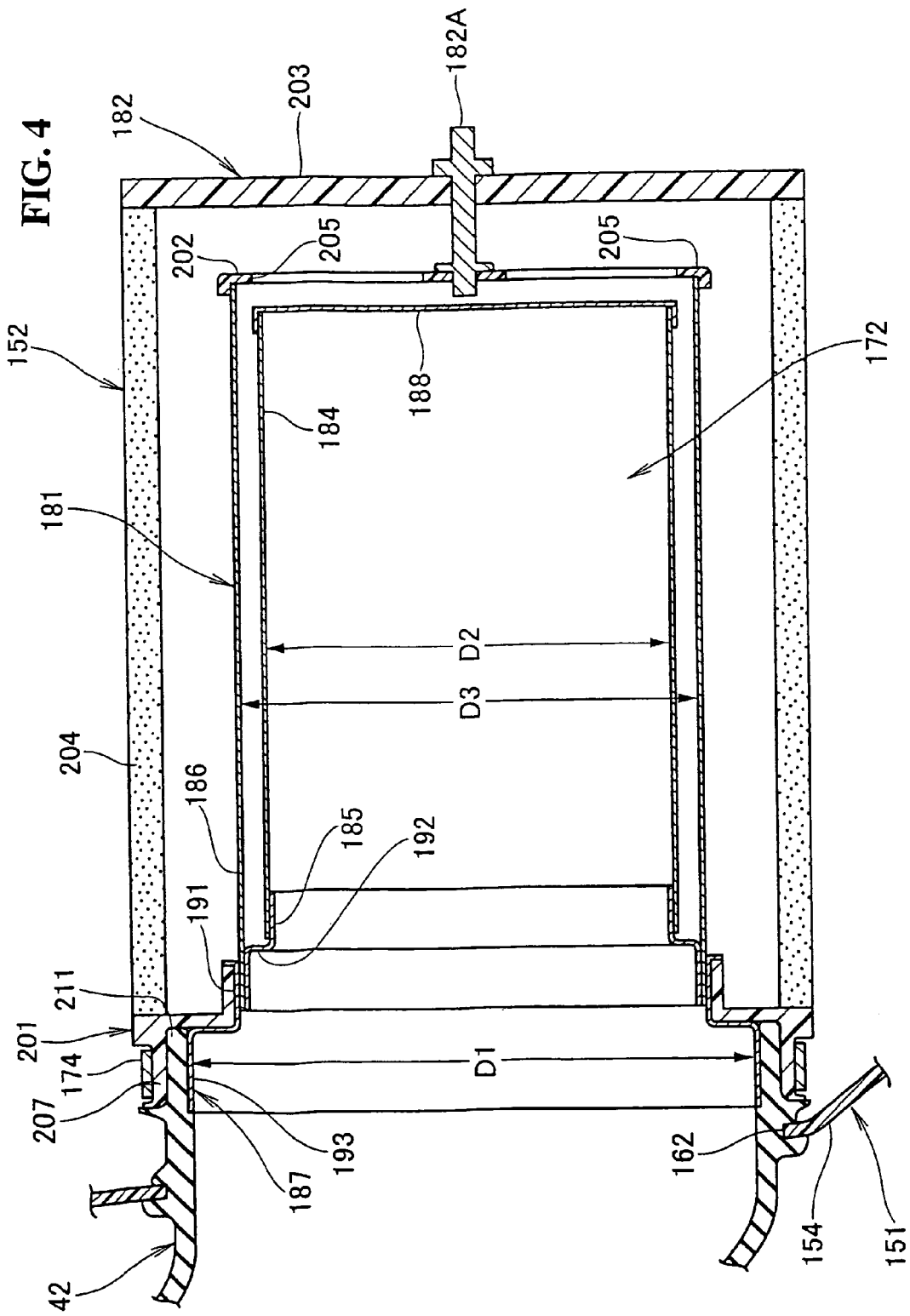
FIG. 4 is a sectional view illustrating the joined condition of the connecting tube and the air cleaner element according to the present invention.

FIG. 4 is a sectional view illustrating the joined condition of the connecting tube and the air cleaner element according to the present invention. The air cleaner element 152 is composed of a frame member 181 serving as a skeleton, a filter support portion 182 mounted to the frame member 181, and a filter 204.

The frame member 181 is a metallic member for maintaining the shape of the air cleaner element 152 and plays the role of a flame trap for stopping a backfire coming from the engine side or trapping soot arising from the backfire. In addition, the frame member 181 permits a reduction in noise. The frame member 181 is composed of an inner frame 184 provided with numerous minute holes, an outer frame 186 mounted to the inner frame 184 through a connection frame 185, and an end frame 187 attached to an end portion of the outer frame 186. The frames 184 to 187 are tubular in shape, and only the inner frame 184 is provided with a bottom plate 188.

The end frame 187 is a member composed of a small diameter portion 191, a step portion 192, and a large diameter portion 193, with the inside diameter D1 of the large diameter portion 192 being greater than the inside diameter D2 of the inner frame 184 and the inside diameter D3 of the outer frame 186. More specifically, the inside diameter D1 (and the outside diameter) of the large diameter portion 192 is greater than that of any other portion of the frame member 181.

Therefore, unlike in the prior art, the joint portion between the connecting tube and the air cleaner element is not narrowed. Thus, in the present invention, the intake efficiency can be enhanced.

The filter support portion 182 is composed of a tubular first end member 201 mounted to the end frame 187, a second end member 202 mounted to one of opening portions of the outer frame 186, and a third end member 203 mounted to the second end member 202 through a support member 182A, with a tubular filter 204 mounted to the first end member 201 and the third end member 203. A plurality of ventilation holes 205 are opened in the second end member 202.

Therefore, air on the dirty side passes through the filter 204, the ventilation holes 205 of the second end member 202, and the minute holes in the inner frame 184, to reach the clean side 172.

A tubular opening end portion 207 is provided in the first end member 201, and a band 174 is fitted over the outer peripheral surface of the tubular opening end portion 207.

The large diameter portion 193 of the air cleaner element 152 and the tubular opening end portion 207 are members joined by fitting to a tubular tip end portion 211 of the connecting tube 42.

Thus, the connecting tube 42 and the air cleaner element 152 are joined through tube-tube fitting, and therefore do not occupy a large joint space in the radial direction (the vertical direction in FIG. 4), so that the air cleaner case 151 can be reduced in size.

The points for mounting the air cleaner element 152 to the connecting tube 42 will be described next.

Figure 5:
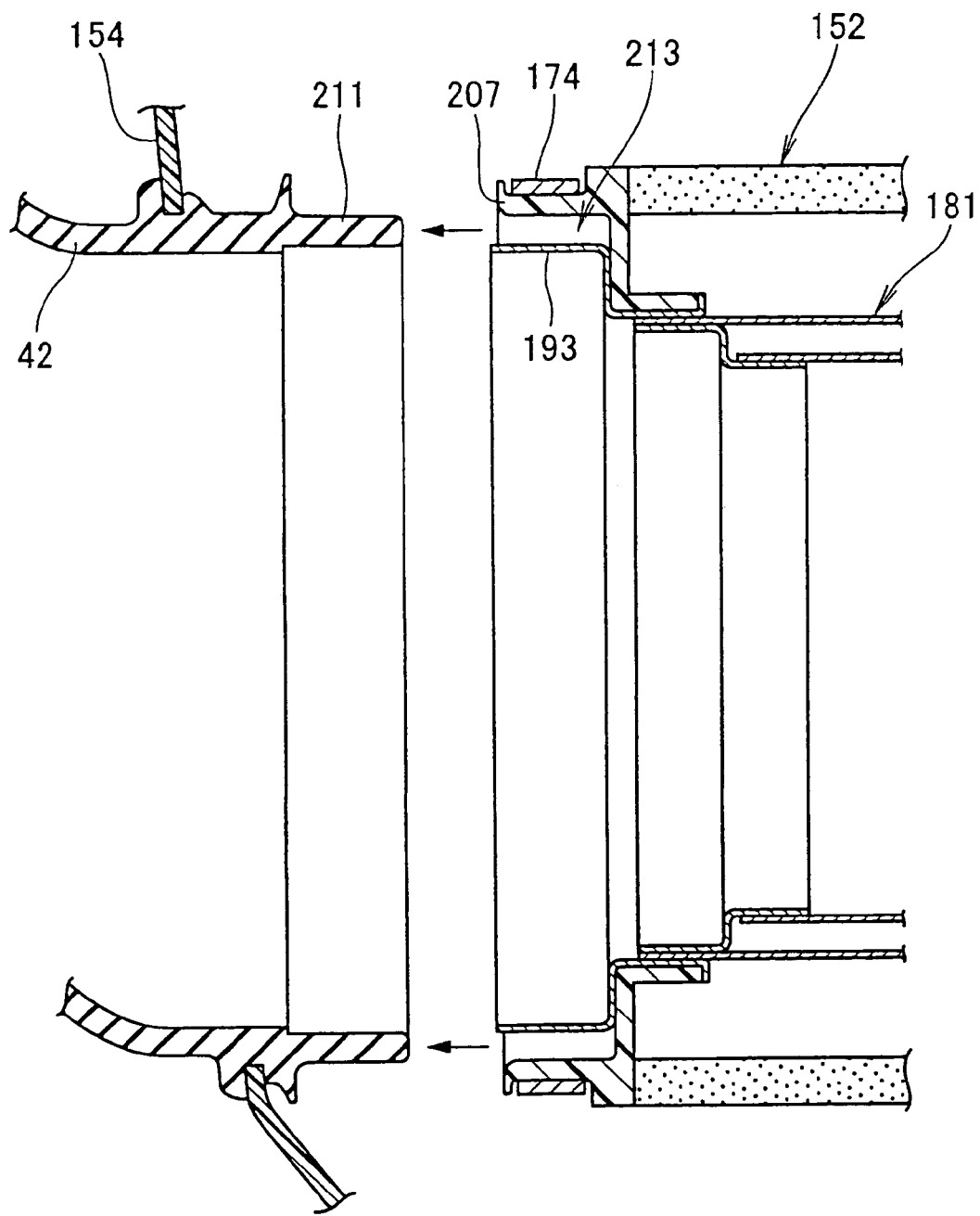
FIG. 5 is a functional view showing the points in mounting the air cleaner element according to the present invention.

FIG. 5 is a functional view showing the points for mounting the air cleaner element according to the present invention.

The connecting tube 42 is preliminarily mounted to the case main body 154, and the tip end of the air cleaner element 152 is fitted over the connecting tube 42.

More specifically, an annular space 213, formed between the tubular opening end portion 207 and the large diameter portion 193 of the air cleaner element 152, is fitted onto a tubular tip end portion 211 of the connecting tube 42.

Then, the band 174 which was loosened is tightened. As a result, the tubular tip end portion 211 and the tubular opening end portion 207 are firmly fastened to the large diameter portion 193 with a high amount of rigidity. Thus, an air-tight connection between the tubular tip end portion 211 and the tubular opening end portion 207 can be enhanced.

As has been described referring to FIGS. 3 and 4 above, the present invention includes the intake system 36 that is disposed on the upstream side of the carburetor 43 (see FIG. 2) for producing an air-fuel mixture and includes the air cleaner case 151 and the connecting tube 42 connected, respectively, to the carburetor 43 and the air cleaner case 151. The intake system 36 includes the tubular tip end portion 211 of the connecting tube 42 with the tubular tip end portion 211 serving as a tip end portion disposed in the air cleaner case 151. The tubular opening end portion 207 is an opening end portion provided in the air cleaner element 152 contained in the air cleaner case 151 for connection to the tubular tip end portion 211 of the connecting tube 42. The large diameter portion 193 is a support portion provided in the frame member 181 serving as a core of the air cleaner element 152 for supporting the tubular end portion 211 and the tubular opening end portion 207 in the condition where the tubular tip end portion 211 and the tubular opening end portion 207 are fitted. The large diameter portion 193 is larger in diameter than any other portion of the frame member 181.

Since the tubular tip end portion 211 of the connecting tube 42 and the tubular opening end portion 207 of the air cleaner element 152 are fitted to each other and the large diameter portion 193 for supporting the tubular tip end portion 211 and the tubular opening end portion 207 is made greater in diameter than any other portion of the frame member 181, the space in the radial direction of the connection portion between the connecting tube 42 and the air cleaner element 152 can be reduced. Thus, a reduction in the size of the air cleaner case 151 can be obtained.

In addition, since the large diameter portion 193 is larger in diameter than any other portion of the frame member 181, the air passage in the air cleaner element 152 can be secured to be large, the intake air amount can be increased, and the intake efficiency can be enhanced.

An embodiment of the present invention the tubular tip end portion 211 that is disposed on the inside of the tubular opening end portion 207.

Since the tubular tip end portion 211 is disposed on the inside of the tubular opening end portion 207, it is possible to make it difficult for air on the dirty side 171 to flow into the clean side 172 through the fitting portion between the tubular tip end portion 211 and the tubular opening end portion 207.

An embodiment of the present invention includes an air cleaner element 152 that is tubular in shape.

Since the air cleaner element 152 may be tubular in shape, the occupying space inside the air cleaner case 151 can be reduced, and the air cleaner case 151 can be further reduced in size.

Further, while the tubular tip end portion 211 of the connecting tube 42 and the tubular opening end portion 207 of the air cleaner element 152 are fitted to each other and the tubular tip end portion 211 and the tubular opening end portion 207 are supported by the large diameter portion 193 as shown in FIG. 4 in the embodiment of the present invention, this configuration is not limitative; for example, there may be adopted a configuration in which the tubular opening end portion 207 is eliminated from the first end member 201, the large diameter portion 193 is fitted to the tubular tip end portion 211, and the outer peripheral surface of the tubular tip end portion 211 is fastened directly by the band 174.

The intake system according to the present invention is preferable for saddle ride type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake system being disposed on the upstream side of a producer for the production of an air-fuel mixture and comprising an air cleaner case and a connecting tube for connecting said producer and said air cleaner case, wherein said intake system comprises:
   a tip end portion of said connecting tube, said tip end portion disposed in said air cleaner case;
   an opening end portion provided on one end of an air cleaner element contained in said air cleaner case, for connection to said tip end portion of said connecting tube; and
   a frame member disposed inside said air cleaner element and serving as a core of said air cleaner element,
   said frame member having a support portion formed at an end portion thereof for supporting said tip end portion and said opening end portion in the condition where said tip end portion and said opening end portion are fitted to each other,
   said opening end portion, said tip end portion, and said support portion being disposed one atop the other in a radial direction of the air cleaner element, and
   said support portion being larger in diameter than any other portion of said frame member.

2. The intake system as set forth in claim 1, wherein said tip end portion is disposed on the inside of said opening end portion.

3. The intake system as set forth in claim 1, wherein said air cleaner element is tubular in shape.

4. The intake system as set forth in claim 2, wherein said air cleaner element is tubular in shape.

5. The intake system as set forth in claim 1, and further including a band disposed around a portion of said opening end portion for securing said opening end portion to said tip end portion.

6. The intake system as set forth in claim 5, and further including an attachment member for securing said band relative to said opening end portion and said tip end portion.

7. The intake system as set forth in claim 1, wherein said frame member is a metallic skeleton member disposed within said air cleaner element for supporting said tip end portion.

8. The intake system as set forth in claim 7, and further including a support member for mounting between an air cleaner support element and a distal end of said frame member.

9. An intake system disposed on the upstream side of a producer for the production of an air-fuel mixture, comprising:
   an air cleaner case adapted to be connected to a connecting tube in order to connect said producer and said air cleaner case,
   a tip end portion of said connecting tube, said tip end portion disposed in said air cleaner case;
   an opening end portion provided on one end of an air cleaner element contained in said air cleaner case, for connection to said tip end portion of said connecting tube; and
   a support portion provided in a frame member serving as a core of said air cleaner element, for supporting said tip end portion and said opening end portion in the condition where said tip end portion and said opening end portion are fitted to each other,
   wherein said frame member includes a tubular outer frame member and a tubular inner frame member provided with a plurality of apertures being disposed within said outer frame member.

10. The intake system as set forth in claim 9, wherein said frame member is tubular and an inside diameter of said support portion is larger in diameter relative to said tubular inner frame member, and
   said tubular outer frame member is larger in diameter relative to said tubular inner frame member and smaller in diameter relative to said support portion.

11. An air cleaner case adapted to be connected to a connecting tube being disposed on an upstream side and in communication with an intake system comprising:
   a tip end portion formed on said connecting tube;
   an opening end portion formed on one end of an air cleaner element, said opening end portion being adapted to be connected to said tip end portion of said connecting tube; and
   a frame member disposed inside said air cleaner element and serving as a core of said air cleaner element,
   said frame member having a support portion formed at an end portion thereof for supporting said tip end portion and said opening end portion in the condition where said tip end portion and said opening end portion are fitted to each other,
   said opening end portion, said tip end portion, and said support portion being disposed one atop the other in a radial direction of the air cleaner element, and
   said support portion of said frame member being larger in diameter relative to any other portion of said frame member.

12. The air cleaner case as set forth in claim 11, wherein said tip end portion is disposed on the inside of said opening end portion.

13. The air cleaner case as set forth in claim 11, wherein said air cleaner element is tubular in shape.

14. The air cleaner case as set forth in claim 12, wherein said air cleaner element is tubular in shape.

15. The air cleaner case as set forth in claim 1, and further including a band disposed around a portion of said opening end portion for securing said opening end portion to said tip end portion.

16. The air cleaner case as set forth in claim 15, and further including an attachment member for securing said band relative to said opening end portion and said tip end portion.

17. The air cleaner case as set forth in claim 11, wherein said frame member is a metallic skeleton member disposed within said air cleaner element for supporting said tip end portion.

18. The air cleaner case as set forth in claim 17, and further including a support member for mounting between an air cleaner support element and a distal end of said frame member.

19. The air cleaner case as set forth in claim 11, wherein said frame member includes an outer frame member and an inner frame member provided with a plurality of apertures being disposed within said outer frame member.

20. The air cleaner case as set forth in claim 19, wherein said frame member is tubular and an inside diameter of said support portion is larger in diameter relative to said inner frame member and said outer frame member is larger in diameter relative to said inner frame member and smaller in diameter relative to said support portion.

* * * * *